(12) United States Patent
Iijima et al.

(10) Patent No.: US 7,048,299 B2
(45) Date of Patent: May 23, 2006

(54) AIR BAG APPARATUS FOR A SCOOTER TYPE MOTORCYCLE

(75) Inventors: Satoshi Iijima, Saitama (JP); Mikio Kubo, Saitama (JP); Hitoshi Iwasaka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/718,803

(22) Filed: Nov. 24, 2003

(65) Prior Publication Data

US 2004/0150197 A1    Aug. 5, 2004

Related U.S. Application Data

(63) Continuation of application No. 10/378,836, filed on Mar. 5, 2003, now abandoned.

(30) Foreign Application Priority Data

Mar. 6, 2002  (JP) .............................. 2002-060864
Feb. 6, 2003  (JP) .............................. 2003-029523

(51) Int. Cl.
*B60R 21/22*    (2006.01)
(52) U.S. Cl. .................................................. 280/730.1
(58) Field of Classification Search ............. 280/730.1, 280/733, 743.1, 743.2, 749
See application file for complete search history.

(56) References Cited

U.S. PATENT DOCUMENTS 6,000,715 A * 12/1999 Tschaeschke ............. 280/730.2
6,773,028 B1 * 8/2004 Itabashi et al. ........... 280/730.1
2004/0207189 A1* 10/2004 Miyata ..................... 280/743.2

FOREIGN PATENT DOCUMENTS

| JP | 09-328053 A |   | 12/1997 |
| JP | 10-035564 A |   | 2/1998 |
| JP | 10035564 A | * | 2/1998 |
| JP | 11278342 A | * | 10/1999 |
| JP | 2002137779 A | * | 5/2002 |

* cited by examiner

*Primary Examiner*—Faye M. Fleming
(74) *Attorney, Agent, or Firm*—Birch, Stewart & Kolasch & Birch, LLP (57) ABSTRACT

An air bag apparatus for a compact vehicle, having an air bag that is capable of restraining an operator on a seat from a front direction, in response to an expansion of the air bag, wherein it is possible to securely restrain the operator on the seat without a need for enlarging the expansion volume of the air bag, even if a yaw behavior and/or a rolling behavior of the vehicle body are/is large. The air bag and the vehicle to the rear of the seat are linked via a pair of restraining belts at the right and left, which are stored in the vehicle body, when the air bag is in a state of being folded, and which come into a state of tension, at the right and left exterior sides of the operator on the seat, when the air bag expands.

21 Claims, 5 Drawing Sheets

AIR BAG APPARATUS FOR A SCOOTER TYPE MOTORCYCLE

CROSS-REFERENCE TO RELATED APPLICATIONS

The present nonprovisional application claims priority under 35 USC 119 to Japanese Patent Application No. 2002-060864 filed on Mar. 6, 2002 and Japanese Patent Application No. 2002-029523 filed on Feb. 6, 2003 [the entire contents thereof is hereby incorporated by reference]. This Application is a Continuation Application of U.S. application Ser. No. 10/378,836, filed on Mar. 5, 2003 now abandoned. The entirety of the contents of the above Applications are hereby incorporated by reference.

BACKGROUND OF THE INVENTION

1. Field of the Invention

The present invention relates to an air bag apparatus for a scooter type motorcycle, having an air bag that is capable of restraining an operator on a seat from a front direction, in response to expansion of the air bag.

2. Description of Background Art

Conventionally, a type of air bag apparatus is known, for example, as disclosed in the Gazette of Japanese Patent Application Laid-Open No. Hei 9-328053.

However, with the conventional apparatus, there is a possibility that the operator cannot be restrained sufficiently, even when the air bag expands in front of the operator on the seat, in the case where yaw behavior and/or rolling behavior of the vehicle body are/is large. In order to achieve a secured restraint, it is necessary to enlarge the expansion volume of the air bag, and accordingly, other components, such as an inflator, tend to become oversized.

SUMMARY AND OBJECTS OF THE INVENTION

It is an object of the present invention to provide an air bag apparatus for a scooter type motorcycle, which is capable of securely restraining the operator on the seat, without a need for enlarging the expansion volume of the air bag, even when the yaw behavior and/or rolling behavior of the vehicle body are/is large.

In order to achieve the above objective, the present invention provides an air bag apparatus for a scooter type motorcycle that includes an air bag that is capable of retraining an operator on a seat from a front direction in response to an expansion of the air bag, wherein, the air bag and a vehicle body in the rear of the seat are linked via restraining belts or retraining nets, being a pair at right and left, which are stored in the vehicle body when the air bag is in a folded state, and which become in a state of tension on both exterior sides at the right and left of an operator on the seat, when the air bag expands.

With the configuration of the invention, the restraining belts or the restraining nets are arranged in a state of tension on the both right and left exterior sides of the operator on the seat, at the time of the air bag expansion in response to the action of a shock against the vehicle. Therefore, it is possible to restrain the operator from the both right and left sides, with the restraining belts or the restraining nets, even when the yaw behavior and/or the rolling behavior of the vehicle body are/is large. Accordingly, it is possible to securely restrain the operator from a front direction, even with the air bag having a small expansion volume.

The present invention includes a vehicle body cover constituting the vehicle body together with a vehicle body frame having a head pipe on a front end thereof. The head pipe supports a front fork in an orientation-manipulative manner and includes a front cover, which covers a circumference of the head pipe, and an air bag housing for storing the air bag installed at a forward position of the seat in the rear of the front cover. With this configuration, on a scooter type motorcycle having a concave shape between the seat and the head pipe, formed by denting downwardly the vehicle body, it is possible by the air bag, to securely restrain the operator on the seat from a front direction, without a large modification of the vehicle body shape.

Furthermore, the vehicle body cover includes, in addition to the front cover, a pair of leg shields at the right and left for covering forward portions of the operator's legs. The leg shields are joined with both right and left sides of the front cover, respectively. A pair of footrest sections are provided at the right and left connecting, respectively, to the leg shields for supporting the feet of the operator. A rear cover is jointed with the footrest sections, for covering both right and left sides of a rear part of the vehicle body frame, wherein, the restraining belts or the restraining nets, an end of which is fixedly linked with the air bag and another end of which is linked with the rear cover, are stored in storage grooves, being a pair at right and left, which are provided over along the front cover, the leg shields, the footrest sections and the rear cover, in such a manner to allow the restraining belts or the restraining nets to be pulled out, in response to a tension thereof, with expansion of the air bag. With this configuration, it is possible for the scooter type motorcycle having footrest sections formed between the seat and the front cover, to store the restraining belts or the restraining nets, so as not to be obstacles at the time of getting on/off and driving, as well as maintaining a natural external view, when the air bag is in a state of non-expanded.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, modes for carrying out the present invention will be explained, based on the embodiments of the present invention as shown in the attached drawings.

Figure 1:
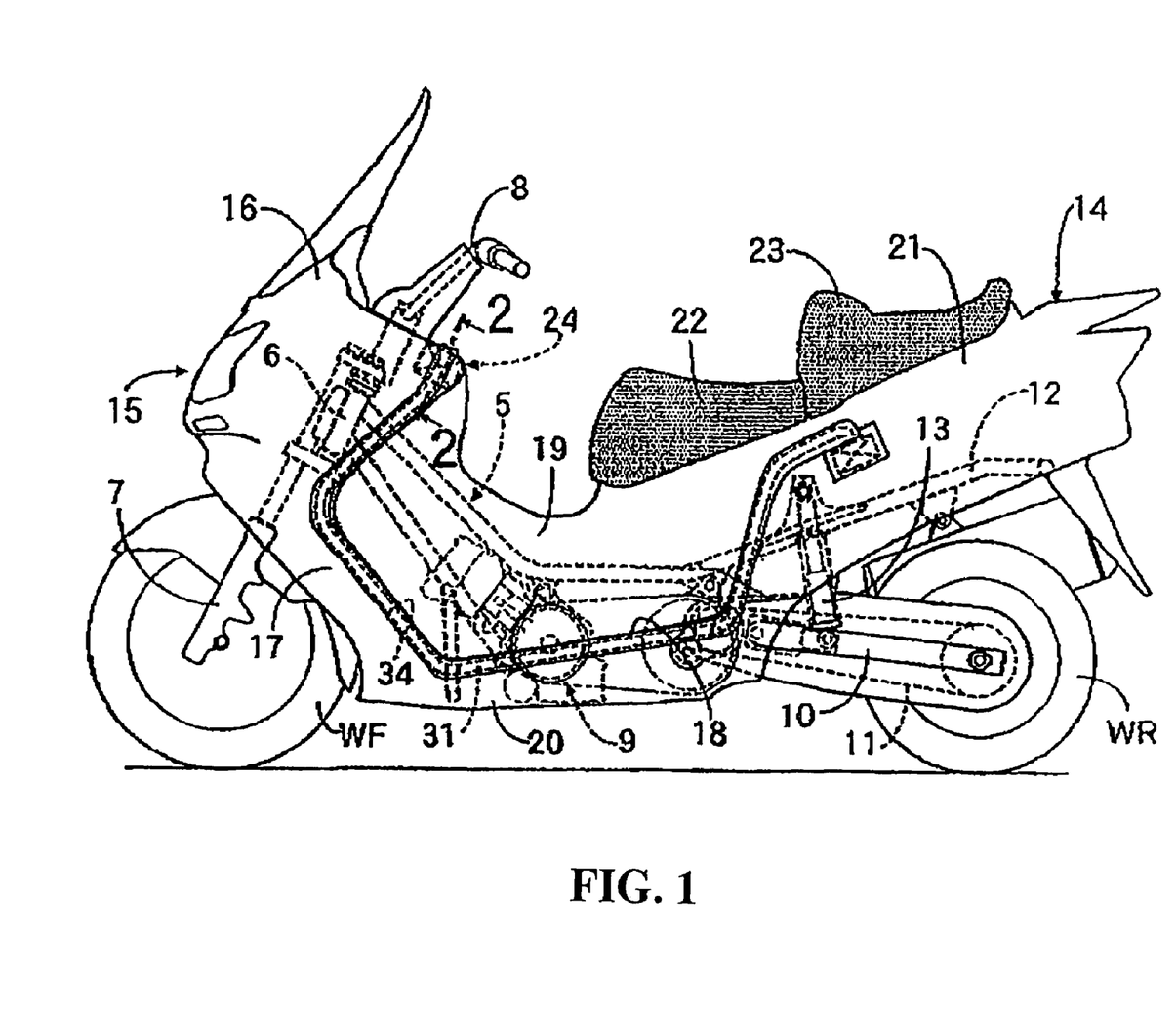
FIG. 1 is a side view of a scooter type motorcycle of the first embodiment of the present invention.

As illustrated in FIG. 1, a head pipe 6 is provided at a front end of a vehicle body frame 5 of a scooter type motorcycle. A front fork 7 is supported in orientation-manipulative manner with a front wheel WF axially supported at the lower end of the front fork 7. An orientation-manipulating handle 8 is coupled with the upper portion of the front fork 7.

At a midway point between the front and rear of the vehicle body frame 5, a power unit 9 containing an engine and a transmission is mounted. A rear wheel WR is axially supported at the rear on a swing arm 10 which is supported by the rear portion of the power unit 9, in such a manner that movement up and down is possible. Further, power from the power unit 9 is transmitted to the rear wheel WR via an endless type chain 17.

A rear shock absorber unit 13 is installed between a seat rail 12 and the swing arm 10, which are provided in the rear of the vehicle body frame 5.

The vehicle body frame 5 is covered with a vehicle body cover 15, made of synthetic resin, which constitutes the vehicle body 14 together with the vehicle body frame 5. The vehicle body cover 25 covers a circumference of the head pipe 6, and further includes a front cover 16 for covering the front wheel WF from above. A pair of leg shields 17 are provided at the right and left for covering a forward portion of the operators legs. The leg shields are joined with both right and left sides of the front cover 16, respectively. A pair of footrest sections 18 are provided at the right and left that are connecting to the leg shields 17, respectively, so as to support the feet of the operator. A floor tunnel section 19 is raised upwardly between the footrest sections 18, skirt sections 20 that are hanging downwardly from outer edges of the both footrest sections 18, respectively, and a rear cover 21 which is joined with the footrest sections 18 and the floor tunnel section 19, covering the both right and left sides of the rear part of the vehicle body frame 5.

On the rear cover 21 is mounted a front seat 22 on which an operator sits, and a rear seat 23, on which a passenger sits with the rear seat being arranged in the rear of the front seat 22.

Figure 2:
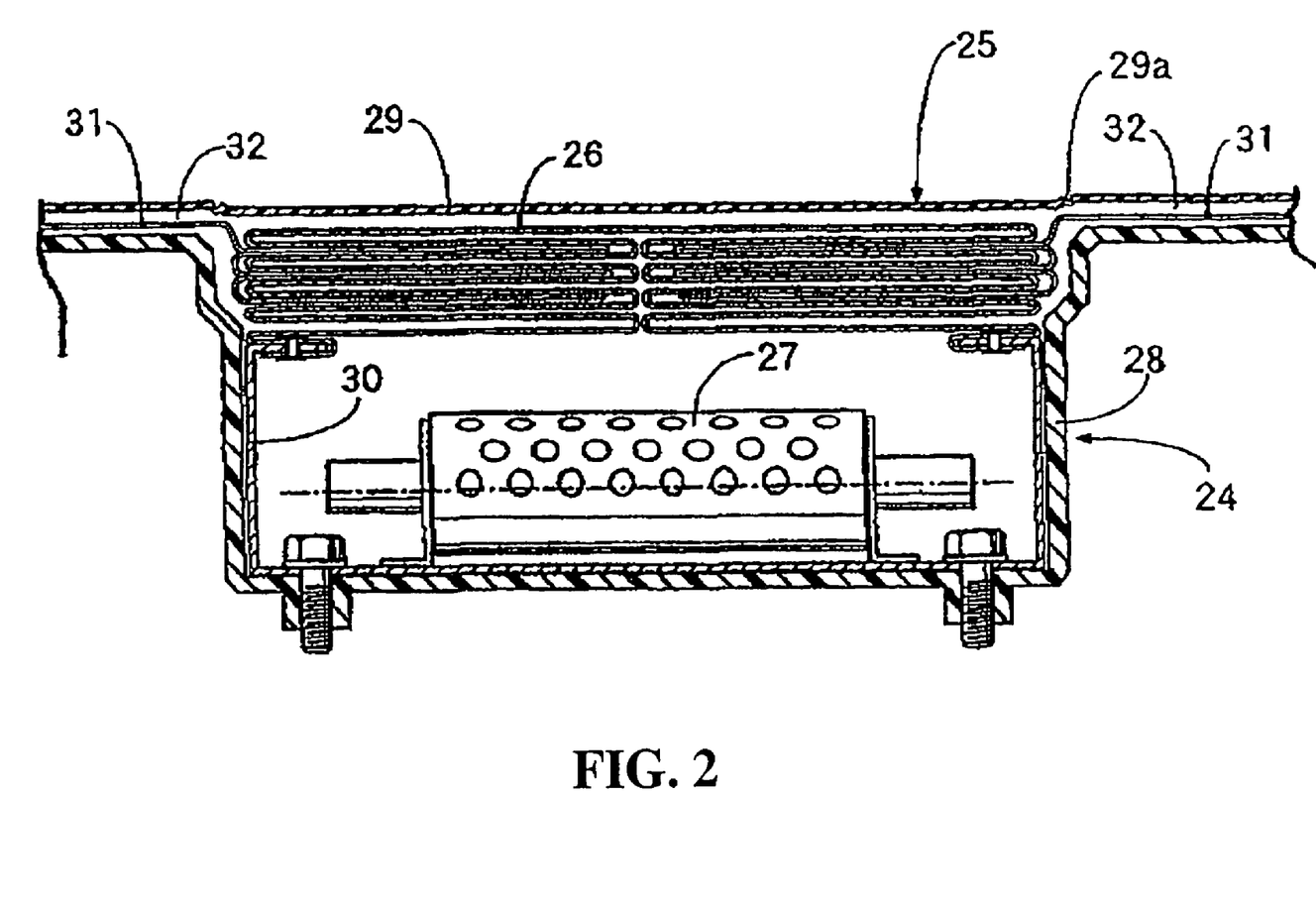
FIG. 2 is an enlarged cross sectional view of FIG. 1, taken along line 2—2.

FIG. 2 illustrates an air bag module 24 of the air bag apparatus that is installed at a position in front of the operator sitting on the front seat 22, for example, to the rear of the front cover 16.

The air bag module 24 comprises an air bag housing 25, an air bag 26 stored in the air bag housing 25, and an inflator 27 to generate gas for expanding the air bag 26.

The air bag housing 25 comprises a storage tube unit 28, which is formed in the shape of tube having a tangible bottom, made of synthetic resin, in such a manner that it is capable of storing the air bag 26 in a folded manner. A cover unit 29 is provided for closing an upper end opening of the storage tube unit 28. The storage tube unit 28 is installed in the rear of the front cover 16, either integrally or as a separate member.

On the periphery of the cover unit 29, a fragile portion 29a is provided, except for one point in the peripheral direction. The fragile portion 29a is formed in such a manner that it is capable of easily bursting.

The air bag 26 is formed in a shape of bag, having an opening portion 26a on the undersurface thereof, and it is stored in the air bag housing 25, in a folded manner. Further, the inflator 27 is supported by a cap 30 that is mounted fixedly to the opening portion 26a on the undersurface of the air bag 26. The cap 30 is fixed on a block end of the storage tube unit 28.

A shock detecting sensor (not shown), such as an acceleration sensor, is installed on the vehicle body frame 5. The inflator 27 is activated in response to the detection of a shock not smaller than a predetermined value by the shock detecting sensor so as to provide a high pressure gas into the air bag 26.

At a position corresponding to the fragile portion 29a and between the storage tube unit 28 and the cover unit 29 of the air bag housing 25, a pair of through holes 32, 32 a provided at right and left portions thereof. Ends of restraining belts 31, 31 are provided as a pair at right and left portions that are made of nylon, for example, and are inserted through both of the through holes 32, 32, respectively, into the air bag housing 25, so that the restraining belts are fixedly joined with both sides of the air bag 26, respectively.

The other ends of both restraining belts 31, 31 are fixedly attached to both right and left sides of the rear cover 21 of the vehicle body 14, to the rear of the front seat 22. The length of the restraining belts 31, 31 becomes short so that the belts can be stored in the vehicle body 14 when the air bag 26 is folded within the air bag housing 25. On the other hand, when the air bag 26 expands, the restraining belts are set to be in a state of tension on both the right and left exterior sides of the operator positioned on the front seat 22.

On the vehicle body cover 15 of the vehicle body 14, a pair of storage grooves 34 are provided at the right and left allowing the restraining belts 31, 31 to be stored therein. The storage grooves 34 are provided over along the front cover 16, the leg shield 17, the footrests 18 and the rear cover 21. These storage grooves 34 are covered with a cover (not shown), which is capable of bursting in accordance with the tension of the restraining belts 31, 31 accompanied with expansion of the air bag 26. In other words, the restraining belts 31 are stored in the storing grooves 34, so as to be pulled out in response to the tension of the restraining belts 31, with the expansion of the air bag 26.

Figure 3:
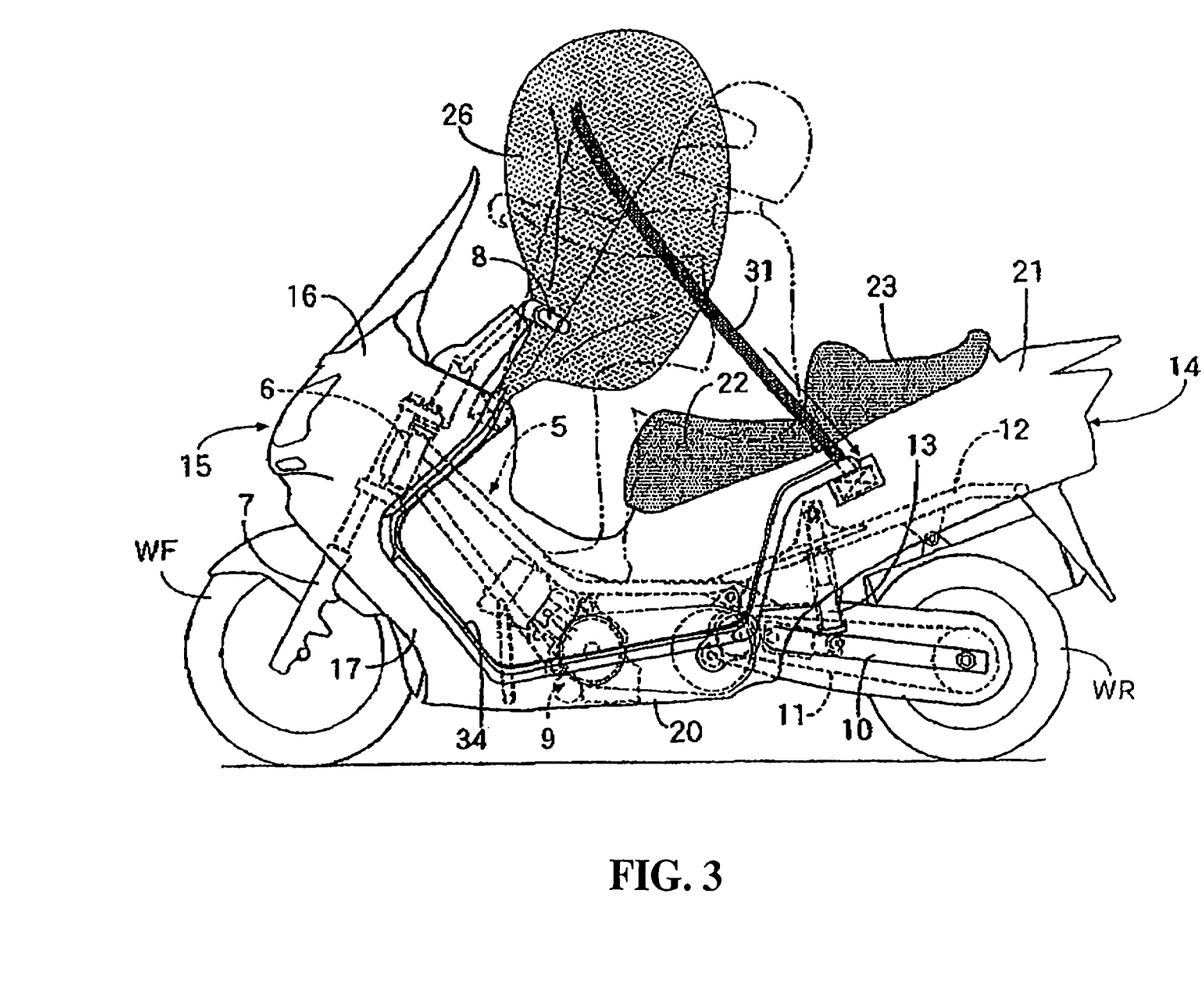
FIG. 3 is a side view of the scooter type motorcycle, at the time of air bag expansion.
Figure 4:
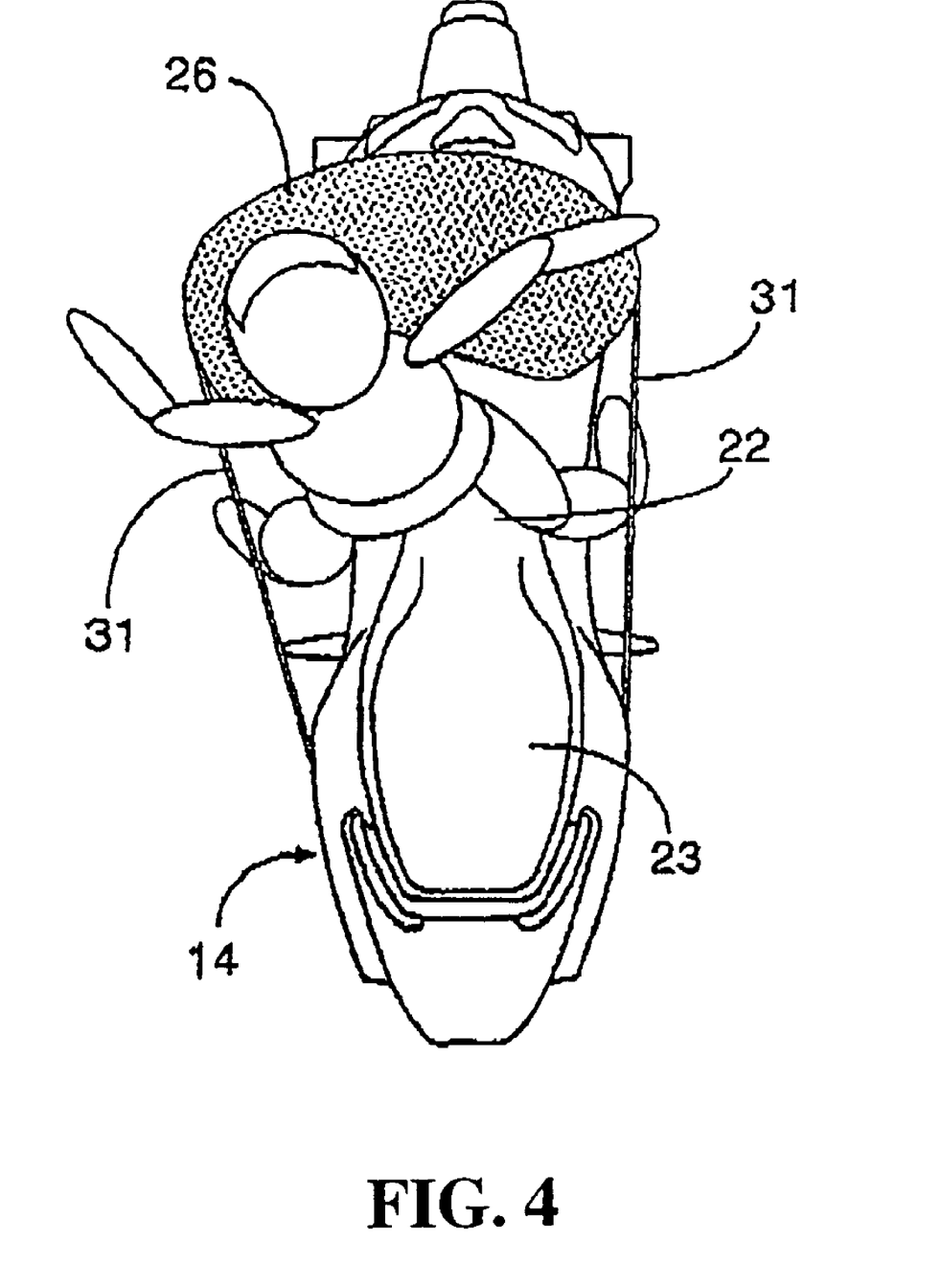
FIG. 4 is a plan view of FIG. 3.

Next, an operation of the first embodiment will be explained. When the shock detecting sensor detects a shock of not smaller than a predetermined value, due to a collision and the like, the inflator 27 is activated and provides high pressure gas into the air bag 26. Then, as shown in FIG. 3 and FIG. 4, the air bag 26 allows the fragile part 29a of the air bag housing 25 to burst, and expands upwardly instantaneously, along with the opening of the cover unit 29. Accordingly, the operator sitting on the front seat 22 is restrained from the front direction with the thus expanded air bag 26.

In the meantime, the air bag 26 and the rear cover 21 of the vehicle body 14 positioned to the rear of the front seat 22 are linked via restraining belts 31, 31, being a pair at right and left belts, which are stored in the vehicle body cover 15 of the vehicle body 14, when the air bag 26 is in a state of folded, and which come into a state of tension, at right and left exterior sides of the operator on the seat 22, when the air bag expands.

Accordingly, when the air bag 26 expands, the restraining belts 31, 31 are arranged in a state of tension at right and left exterior sides of the operator on the front seat 22, whereby the operator can be restrained from both the right and left sides with the restraining belts 31, 31, even if a yaw behavior and/or a rolling behavior of the vehicle body 14 are/is large.

Therefore, it is possible to securely restrain the operator from the front direction, even with the air bag 26 has a small expansion volume.

In addition, since the air bag housing 25 for storing the air bag 26 is installed at a forward position of the front seat 22 and in the rear of the front cover 16, a scooter type motorcycle having a concave shape between the front seat 22 and the head pipe 6, formed by denting downwardly the vehicle body 14, does not need a large modification of the vehicle body shape. Thus, it is possible for the air bag 26 to securely restrain the operator on the front seat 22 from a front direction.

Moreover, the restraining belts 31, an end of which is fixedly linked with the air bag 26 and another end of which is linked with the rear cover 21 are stored in a pair of storage grooves 34 at the right and left, which are provided over along the front cover 16, the leg shields 17, the footrest sections 18 and the rear cover 21, in such a manner so as to allow the restraining belts 31 to be pulled out, in response to a tension thereof, with expansion of the air bag 26. With this configuration, it is possible for the scooter type motorcycle having footrest sections 18 formed between the front seat 22 and the front cover 16 to store the restraining belts 31 so as not to be obstacles at the time of getting on/off the vehicle or when driving the vehicle, as well as maintaining a natural external view, when the air bag 26 is in a state of being non-expanded.

Figure 5:
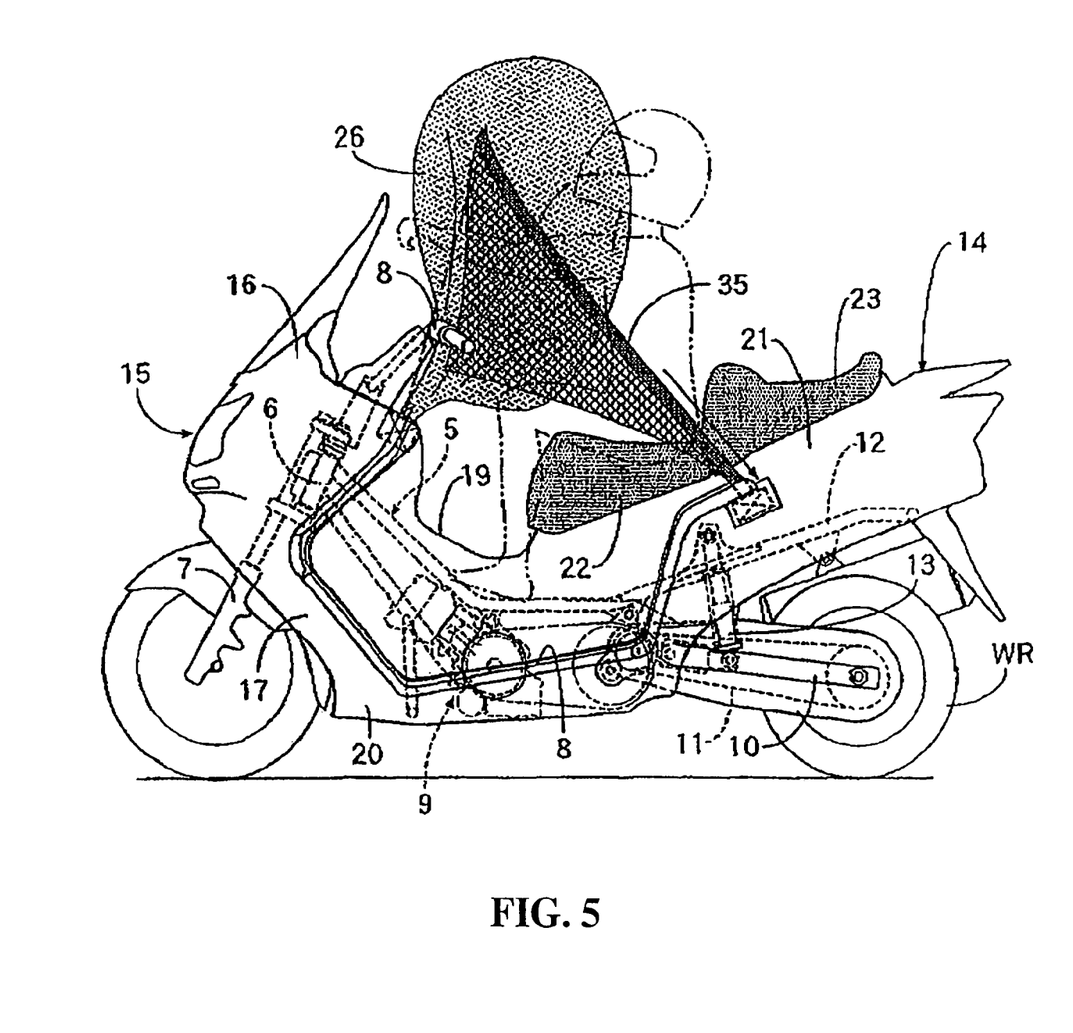
FIG. 5 is a side view of a scooter type motorcycle of the second embodiment of the present invention.

FIG. 5 shows the second embodiment of the present invention, and to the parts corresponding to first embodiment, explanations of the identical reference numbers are applied.

The air bag 26 for restraining the operator on the front seat 22 from the front direction in response to an expansion of the air bag, and the rear cover 21 of the vehicle body 14 in the rear of the front seat 22 are linked via a pair of restraining nets 35 positioned at the right and left, which are stored in the vehicle body cover 15 of the vehicle body, when the air bag 26 is in a state of folded, and which come into a state of tension in the both right and left exterior sides of the operator on the front seat 22, when the air bag 26 expands. These restraining nets 35 are made of nylon, for example.

Similar effects as achieved by the first embodiment can be attained by the second embodiment.

The embodiments of the present invention have been explained above, but the present invention is not limited to the embodiments thus described and various design changes are possible without deviating from the present invention as defined in the claims.

According to the present invention, restraining belts or restraining nets are arranged in a state of tension at right and left exterior sides of an operator on the seat, when the air bag expands. Therefore, it is possible to restrain the operator from both right and left sides with restraining belts or the restraining nets, even if a yaw behavior and/or a rolling behavior of the vehicle body are/is large, whereby the operator can be securely restrained even with the air bag having a small expansion volume.

Furthermore, according to the present invention, a scooter type motorcycle having a concave shape between the seat and the head pipe, formed by denting downwardly the vehicle body, does not need a large modification, of the vehicle body shape, and it is possible by the air bag, to securely restrain the operator on the seat from a front direction.

Furthermore, according to the present invention, it is possible for the scooter type motorcycle having footrest sections formed between the seat and the front cover to store the restraining belts or retraining nets, so as not to be obstacles at the time of getting on/off the vehicle or when driving the vehicle, as well as maintaining a natural external view, when the air bag is in a state of non-expanded.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air bag apparatus for a motorcycle including an air bag capable of restraining an operator on a seat from a front direction, in response to expansion of said air bag comprising:

a pair of restraining belts at a right and a left side of the motorcycle, said pair of restraining belts being stored in a vehicle body when said air bag is in a folded state and come into a state of tension on both exterior sides at the right and the left of the seat when said air bag expands, said pair of restraining belts having a proximal portion fixedly linked to said air bag and distal ends operatively connected to a vehicle body on the right and left sides of the motorcycle, said distal ends being operatively connected to said vehicle body behind a rear portion of the seat, wherein said air bag and the vehicle body to the rear of said seat are linked via the pair of restraining belts.

2. The air bag apparatus for a motorcycle as defined by claim 1, and further including a vehicle body cover constituting said vehicle body together with a vehicle body frame having a head pipe on a front end thereof, said head pipe supporting a front fork in an orientation-manipulative manner wherein a front cover, which covers a circumference of said head pipe, and an air bag housing for storing said air bag is installed at a forward position of said seat and to the rear of said front cover.

3. The air bag apparatus for a motorcycle as defined by claim 2, wherein, said vehicle body cover comprises, in addition to said front cover, a pair of leg shields at the right and left for covering forward portions of the operator's legs, said leg shields being joined with both right and left sides of the front cover, respectively, a pair of footrest sections, at the right and left connecting, respectively, to the leg shields for supporting the feet of the operator, and a rear cover jointed with the footrest sections for covering both right and left sides of a rear part of said vehicle body frame, wherein, said restraining belts, said proximal portion of which is fixedly linked with said air bag and said distal ends of which are linked with said rear cover, are stored in a pair of storage grooves at the right and left, which are provided over along said front cover, said leg shields, said footrest sections and said rear cover, in such a manner for allowing said restraining belts to be pulled out, in response to a tension thereof, with expansion of said air bag.

4. The air bag apparatus for a motorcycle according to claim 1, wherein said pair of restraining belts include a substantially central portion that is stored and positioned to be adjacent to said air bag when said air bag is a folded state and is released to be disposed in proximity to the air bag and in front of the operator in the expanded condition.

5. The air bag apparatus for a motorcycle according to claim 1, wherein the motorcycle is a motorscooter having an open area disposed between a steering handlebar and the seat.

6. The air bag apparatus for a motorcycle according to claim 1, and further including a shock detecting sensor for detecting when a shock not smaller than a predetermined value is applied to the motorcycle for actuating said air bag in response thereto.

7. The air bag apparatus for a motorcycle according to claim 6, wherein the shock detecting sensor is an acceleration sensor.

8. An air bag apparatus for a motorcycle including an air bag capable of restraining an operator on a seat from a front direction, in response to expansion of said air bag comprising:

a restraining belt positioned at a right and a left side of the motorcycle, said restraining belt being stored in a vehicle body when said air bag is in a folded state and comes into a state of tension on both exterior sides at the right and the left of the seat when said air bag expands, said restraining belt having a central portion fixedly linked to said air bag and distal ends operatively connected to a vehicle body on the right and left sides of the motorcycle, said distal ends being operatively connected to said vehicle body behind a rear portion of the seat, wherein said air bag and the vehicle body to the rear of said seat are linked via the pair of restraining belt.

9. The air bag apparatus for a motorcycle as defined by claim 8, and further including a vehicle body cover constituting said vehicle body together with a vehicle body frame having a head pipe on a front end thereof, said head pipe supporting a front fork in an orientation-manipulative manner wherein a front cover, which covers a circumference of said head pipe, and an air bag housing for storing said air bag is installed at a forward position of said seat and to the rear of said front cover.

10. The air bag apparatus for a motorcycle as defined by claim 9, wherein, said vehicle body cover comprises, in addition to said front cover, a pair of leg shields at the right and left for covering forward portions of the operator's legs, said leg shields being joined with both right and left sides of the front cover, respectively, a pair of footrest sections, at the right and left connecting, respectively, to the leg shields for supporting the feet of the operator, and a rear cover jointed with the footrest sections for covering both right and left sides of a rear part of said vehicle body frame, wherein, said restraining belt, the central portion of which is fixedly linked with said air bag and said distal ends of which are linked with said rear cover, are stored in a pair of storage grooves at the right and left, which are provided over along said front cover, said leg shields, said footrest sections and said rear cover, in such a manner for allowing said restraining belt to be pulled out, in response to a tension thereof, with expansion of said air bag.

11. The air bag apparatus for a motorcycle according to claim 8, wherein said restraining belt includes a substantially central portion that is stored and positioned to be adjacent to said air bag when said air bag is a folded state and is released to be disposed in proximity to the air bag and in front of the operator in the expanded condition.

12. The air bag apparatus for a motorcycle according to claim 8, wherein the motorcycle is a motorscooter having an open area disposed between a steering handlebar and the seat.

13. The air bag apparatus for a motorcycle according to claim 8, and further including a shock detecting sensor for detecting when a shock not smaller than a predetermined value is applied to the motorcycle for actuating said air bag in response thereto.

14. The air bag apparatus for a motorcycle according to claim 13, wherein the shock detecting sensor is an acceleration sensor.

15. An air bag apparatus for a scooter type motorcycle including an air bag capable of restraining an operator on a seat from a front direction, in response to expansion of said air bag comprising:

a restraining net having a first end at a right side of the motorcycle and a second end at a left side of the motorcycle, said restraining net being stored in said vehicle body when said air bag is in a folded state and comes into a state of tension on both exterior sides at the right and the left of the seat when said air bag expands, said restraining net having a central portion fixedly linked to said air bag and distal ends operatively connected to a vehicle body on the right and left sides of the motorcycle, said distal ends being operatively connected to said vehicle body behind a rear portion of the seat, wherein said air bag and the vehicle body to the rear of said seat are linked via the restraining net.

16. The air bag apparatus for a motorcycle as defined by claim 15, and further including a vehicle body cover constituting said vehicle body together with a vehicle body frame having a head pipe on a front end thereof, said head pipe supporting a front fork in an orientation-manipulative manner wherein a front cover, which covers a circumference of said head pipe, and an air bag housing for storing said air bag is installed at a forward position of said seat and to the rear of said front cover.

17. The air bag apparatus for a motorcycle as defined by claim 16, wherein, said vehicle body cover comprises, in addition to said front cover, a pair of leg shields at the right and left for covering forward portions of the operator's legs, said leg shields being joined with both right and left sides of the front cover, respectively, a pair of footrest sections, at the right and left connecting, respectively, to the leg shields for supporting the feet of the operator, and a rear cover jointed with the footrest sections for covering both right and left sides of a rear part of said vehicle body frame, wherein, said restraining net, the central portion of which is fixedly linked with said air bag and said distal ends of which are linked with said rear cover, is stored in a pair of storage grooves at the right and left, which are provided over along said front cover, said leg shields, said footrest sections and said rear cover, in such a manner for allowing said restraining net to be pulled out, in response to a tension thereof, with expansion of said air bag.

18. The air bag apparatus for a motorcycle according to claim 15, wherein said restraining net includes a substantially central portion that is stored and positioned to be adjacent to said air bag when said air bag is a folded state and is released to be disposed in proximity to the air bag and in front of the operator in the expanded condition.

19. The air bag apparatus for a motorcycle according to claim 15, wherein the motorcycle is a motorscooter having an open area disposed between a steering handlebar and the seat.

20. The air bag apparatus for a motorcycle according to claim 15, and further including a shock detecting sensor for detecting when a shock not smaller than a predetermined value is applied to the motorcycle for actuating said air bag in response thereto.

21. The air bag apparatus for a motorcycle according to claim 20, wherein the shock detecting sensor is an acceleration sensor.

* * * * *